[66.]

JAMES SWAN.

Improvement in Machinery for Forming the Lips of Augers.

No. 4,569. Reissued Sep. 26, 1871.

Witnesses:
G. Mathews.
Thos. D. D. Durand

Inventor:
James Swan.
PER Munn & Co.
Attorneys.

AM. PHOTO-LITHOGRAPHIC CO. N.Y. (OSBORNE'S PROCESS.)

UNITED STATES PATENT OFFICE.

JAMES SWAN, OF SEYMOUR, CONNECTICUT.

IMPROVEMENT IN MACHINERY FOR FORMING THE LIPS OF AUGERS.

Specification forming part of Letters Patent No. 116,509, dated June 27, 1871; reissue No. 4,569, dated September 26, 1871.

*To all whom it may concern:*

Be it known that I, JAMES SWAN, of Seymour, in the county of New Haven and State of Connecticut, have invented a new Improvement in Machine for Forming the Lips of Augers and Bits; and I do hereby declare the following, when taken in connection with the accompanying drawing and the letters of reference marked thereon, to be a full, clear, and exact description of the same, said drawing constituting part of this specification and representing, in—

Figure 1:
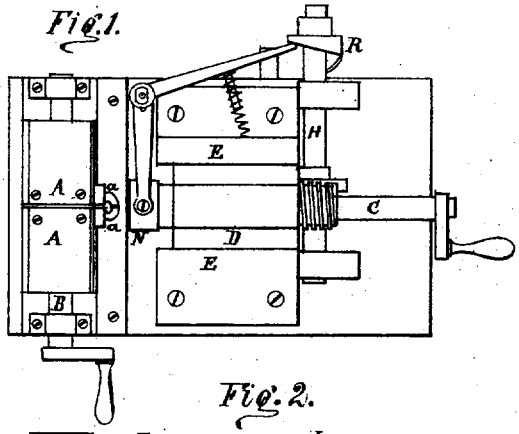
Figure 2:
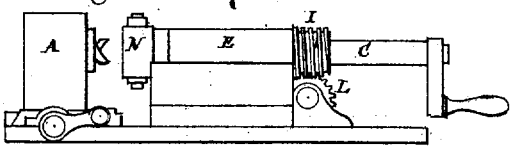
Figure 3:
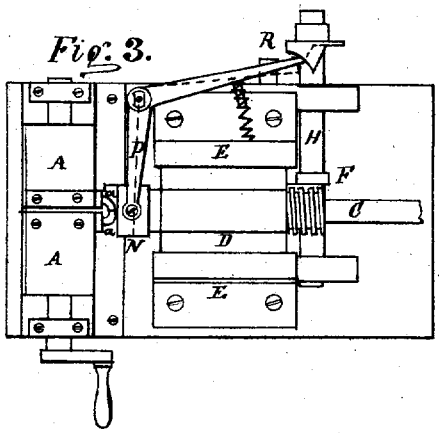

Figure 1, a top view; Fig 2, a side view; Fig. 3, a top view as in the completion of the operation; and in Fig. 4, a longitudinal central section.

This invention relates to an improvement in the machine for which Letters Patent were granted to me dated June 9, 1868, the object being the forming of the lip on bits or augers, known as the "Cook bit," to mechanically turn the lips up and over the dies upon which they are formed; and it consists in combining with a pair of crimp-dies having projections corresponding to the lips to be turned, a rotating mandrel with a sliding sleeve, which, when the follower, revolving, has pressed and shaped the end of the bit, the said sleeve will be moved forward without rotation to force the metal over the projections to the dies. The invention also consists in the combination of certain parts of the operating mechanism irrespective of the sliding sleeve.

I find in practice that it is impracticable to form the Cook bit by spinning—that is to say, by revolving a mandrel to draw, by its revolution, the mandrel into shape. This is owing to the peculiar shape of the Cook bit, the extent to which the metal is turned over to form the gouge-lip being so much greater than in common square-lip bits.

Figure 4:
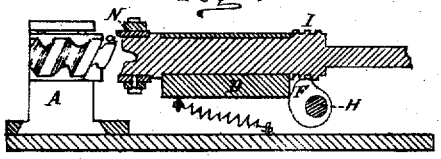

*a a* are the projecting ends of a pair of crimp-dies, which are held in a pair of jaws, A A, and move to and from each other by a right-and-left-hand-threaded screw, B, the said crimp-dies being of the form and size to correspond to the bit or auger on which the lips are to be turned; and the bit, after the twist is formed, is placed in these crimp-dies with the metal for the lip projecting. C is a mandrel, arranged to revolve freely in a carriage, D, in line with the dies, and moving to and from the dies in suitable guides E E. The inner end of the mandrel corresponds to the external shape of the end of the bit to be formed as seen in Fig. 4. The mandrel is caused to revolve by the application of power thereto, and is pressed up against the blank to shape the end of the bit. This is done by a cam, F, on a shaft, H, the said shaft being caused to revolve by a worm, I, on the mandrel, working on a pinion, L, on the shaft; therefore, by turning the mandrel it is forced forward, revolving against the end of the bit. This shapes the end or floor part of the lip. To turn the ends of the lip to form the gouge portion I arrange a sleeve, N, on the end of the mandrel, as seen in Fig. 4, which is held by a forked lever, P, and prevented from revolving with the mandrel by a trunnion or trunnions, to which the said lever P is attached. So soon as the mandrel has shaped the floor portion of the lip, the mandrel still revolving, the sleeve N is forced forward by the action of a cam, R, on the shaft H operating against the lever 3, carrying the sleeve into the position denoted in broken lines, Fig. 3; and in this operation the extreme portion of the lips is forced over onto the projecting dies, shaping the interior of the lip, the forward end of the sleeve being beveled or expanded outwardly to allow it to pass freely onto and turn the lips. It is found that if the sleeve revolves it will draw this class of lips so much as to entirely defeat the object of the machine; but by this arrangement of the non-revolving sleeve the most perfect work is produced. In order to give what is known as the "clear" to the face of the auger-bit I provide the cam F with a teat or rounded projection. The same is formed on the cam at the point where its radius is greatest, so that when the cam is about to complete its rotation it shall act on the mandrel to cause it to make a very sudden rectilinear movement, and thereby force back the metal around the screw-point of the auger-bit and give the desired clear. This it is impracticable to effect by a cam of regular form.

I do not claim as new the projecting crimp-dies or revolving mandrel; but

I do claim as my invention—

1. In combination with the projecting crimp-dies *a a* and revolving mandrel C, the sleeve N, arranged upon the said mandrel and held in position by one or more trunnions, to which the lever P is attached, the said sleeve having a longitudinal movement imparted thereto, through the lever P, by means of the crank R, the internal front of the sleeve being beveled or expanded outwardly, the whole operating in the manner substantially as described.

2. The combination of a pair of holding-dies, a revolving mandrel, C, a carriage, D, cam F, shaft H, worm I, and pinion L, substantially in the manner herein described.

3. The cam F, having a rounded projection, as shown, in combination with the revolving mandrel, C, substantially as and for the purpose specified.

JAMES SWAN.

Witnesses:
GEO. A. ROGERS,
FRED. A. RUGG.

(66)